United States Patent
Pang et al.

(10) Patent No.: US 11,941,346 B2
(45) Date of Patent: Mar. 26, 2024

(54) SYSTEMS AND METHODS FOR LONG DOCUMENT SUMMARIZATION

(71) Applicant: Salesforce, Inc., San Francisco, CA (US)

(72) Inventors: Bo Pang, Los Angeles, CA (US); Erik Nijkamp, Palo Alto, CA (US); Yingbo Zhou, Palo Alto, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 45 days.

(21) Appl. No.: 17/589,650

(22) Filed: Jan. 31, 2022

(65) Prior Publication Data

US 2023/0107640 A1    Apr. 6, 2023

Related U.S. Application Data

(60) Provisional application No. 63/252,526, filed on Oct. 5, 2021.

(51) Int. Cl.
*G06F 40/166*    (2020.01)
*G06F 40/284*    (2020.01)

(52) U.S. Cl.
CPC .......... *G06F 40/166* (2020.01); *G06F 40/284* (2020.01)

(58) Field of Classification Search
CPC ..... G06F 40/166; G06F 40/284; G06F 16/345
See application file for complete search history.

(56) References Cited

U.S. PATENT DOCUMENTS

| | | | |
|---|---|---|---|
| 11,620,457 B2* | 4/2023 | Lebanoff | G06F 40/284 704/9 |
| 2020/0342316 A1* | 10/2020 | Shazeer | G06N 3/044 |
| 2021/0374345 A1* | 12/2021 | Raman | G06F 40/284 |
| 2021/0375289 A1* | 12/2021 | Zhu | G06Q 10/063118 |
| 2022/0165373 A1* | 5/2022 | Kim | G06F 40/216 |
| 2022/0310069 A1* | 9/2022 | Ren | G06N 3/0464 |
| 2023/0020886 A1* | 1/2023 | Mahapatra | G06F 16/345 |

(Continued)

OTHER PUBLICATIONS

Wang et al., "Classification Method of Electric Power Metering Entity identification Model Based on Convolution Attention Network", Document ID: CN 112632993A, published on Apr. 9, 2021, pp. 9 (Year: 2021).*

(Continued)

*Primary Examiner* — Chau T Nguyen
(74) *Attorney, Agent, or Firm* — Haynes and Boone, LLP

(57) ABSTRACT

Embodiments described herein provide methods and systems for effectively and efficiently summarizing long documents. A transformer is provided with bottom-up and top-down inference combined to effectively capture long-range dependency. In the bottom-up inference, each token only attends to nearby tokens within a window of a specified size. In the top-down inference, full self-attention is given using units with coarser granularity. The bottom-up-inferred token representations are then updated with the top-down representations, which is achieved with cross-attention between the top and token levels. Multiple levels of top-down representations with increasingly coarser granularity can be used if documents are extremely long.

20 Claims, 6 Drawing Sheets

(56) References Cited

U.S. PATENT DOCUMENTS

2023/0351102 A1* 11/2023 Tran ...................... G06F 40/169

OTHER PUBLICATIONS

Jingqing Zhang et al., Pegasus: Pre-training with extracted gap-sentences for abstractive summarization. In International Conference on Machine Learning, pp. 11328-11339. PMLR, 2020.

Manzil Zaheer et al., Big bird: Transformers for longer sequences. In NeurIPS, 2020.

Iz Beltagy et al., Longformer: The long-document transformer. arXiv preprint arXiv:2004.05150, 2020.

Cheng et al., Neural summarization by extracting sentences and words. In Proceedings of the 54th Annual Meeting of the Association for Computational Linguistics (vol. 1: Long Papers), pp. 484-494, Berlin, Germany, Aug. 2016. Association for Computational Linguistics. doi: 10.18653/v1/P16-1046. URL https://aclanthology.org/ P16-1046.

Nallapati et al. Abstractive text summarization using sequence-to-sequence mns and beyond. arXiv preprint arXiv:1602.06023, 2016.

Zhang et al., HIBERT: Document level pre-training of hierarchical bidirectional transformers for document summarization. In Proceedings of the 57th Annual Meeting of the Association for Computational Linguistics, pp. 5059-5069, Florence, Italy, Jul. 2019. Association for Computational Linguistics. doi: 10.18653/v1/P19-1499. URL https://aclanthology.org/P19-1499.

Xu et al., Unsupervised extractive summarization by pre-training hierarchical transformers. In Findings of the Association for Computational Linguistics: EMNLP 2020, pp. 1784-1795, Online, Nov. 2020. Association for Computational Linguistics. doi: 10.18653/v1/2020.findings-emnlp.161. URL https: //aclanthology.org/2020.findings-emnlp.161.

Sønderby et al., Ladder variational autoencoders. Advances in neural information processing systems, 29:3738-3746, 2016.

Maaløe et al., Biva: A very deep hierarchy of latent variables for generative modeling. Advances in Neural Information Processing Systems, 32:6551-6562, 2019.

Rewon Child. Very deep vaes generalize autoregressive models and can outperform them on images. In International Conference on Learning Representations, 2020.

Vaswani et al., Attention is all you need. In Advances in neural information processing systems, pp. 5998-6008, 2017.

* cited by examiner

| Dataset | # Docs. | # Input Words | # Summary Words | Domain |
|---|---|---|---|---|
| PubMed | 133K | 3,224 | 214 | Scientific |
| arXiv | 215K | 6,913 | 292 | Scientific |
| TVMegaSite | 22.5K | 6,420 | 380 | Conversational |
| ForeverDreaming | 4.3K | 7,605 | 113 | Conversational |
| BookSum-Chapter-Level | 12K | 5,102 | 505 | Narrative |
| BookSum-Book-Level | 436 | 112,885 | 1,167 | Narrative |
| CNN-DM | 311K | 906 | 63 | News |

FIG. 4

| | PubMed | | | arXiv | | |
|---|---|---|---|---|---|---|
| | R-1 | R-2 | R-L | R-1 | R-2 | R-L |
| Pegasus (568M) | 44.21 | 16.95 | 38.83 | 44.21 | 16.95 | 38.83 |
| Dancer | 46.34 | 19.97 | 42.42 | 45.01 | 17.60 | 40.56 |
| TLM-I+E | 42.13 | 16.27 | 39.21 | 41.62 | 14.69 | 38.03 |
| SSN-DM | 46.73 | 21.00 | 34.10 | 44.90 | 19.06 | 32.77 |
| BigBird (577M) | 46.32 | 20.65 | 42.33 | 46.63 | 19.02 | 41.77 |
| Longformer (460M) | 46.97 | 20.23 | 42.88 | 46.63 | 19.62 | 41.83 |
| LSH | 48.12 | 21.06 | 42.72 | - | - | - |
| Top Down Transformer (AvgPool) (464M) | 48.34 | 21.40 | 44.22 | 48.67 | 20.70 | 43.91 |
| Top Down Transformer (AdaPool) (464M) | 51.05 | 23.26 | 46.47 | 50.95 | 21.93 | 45.61 |
| Top Down Transformer (OracleAdaPool) | 55.15 | 26.55 | 50.25 | 64.16 | 33.39 | 56.88 |

FIG. 5

CNN-DailyMail

| | R-1 | R-2 | R-L |
|---|---|---|---|
| BART (Reported) | 44.15 | 21.28 | 40.90 |
| BART (Re-eval) | 43.93 | 20.81 | 40.79 |
| Ours Top Down Transformer (AvgPool) | 44.32 | 21.03 | 41.40 |
| Ours Top Down Transformer (AdaPool) | 44.85 | 21.31 | 41.15 |
| Top Down Transformer (OracleAdaPool) | 63.87 | 38.42 | 59.10 |

*FIG. 6*

| | TVMegaSite | | | ForeverDreaming | | |
|---|---|---|---|---|---|---|
| | R-1 | R-2 | R-L | R-1 | R-2 | R-L |
| Extractive Oracle | 49.0 | 11.6 | 46.9 | 38.8 | 11.5 | 33.9 |
| Longformer | 42.9 | 11.9 | 41.6 | 25.9 | 4.2 | 23.8 |
| Hybrid (BART + Content Selection) | 38.8 | 10.2 | 36.9 | 25.3 | 3.9 | 23.1 |
| Hybrid (BART + Oracle Content Selection) | 42.1 | 11.9 | 40.9 | 26.4 | 5.0 | 23.3 |
| Ours Top Down Transformer (AvgPool) | 49.30 | 14.35 | 47.45 | 35.84 | 8.86 | 30.62 |
| Ours Top Down Transformer (AdaPool) | 51.02 | 14.66 | 49.01 | 36.84 | 9.19 | 31.12 |
| Top Down Transformer (OracleAdaPool) | 53.55 | 15.63 | 51.29 | 39.54 | 10.08 | 33.59 |

*FIG. 7*

BookSum Chapter Level

| | R-1 | R-2 | R-L |
|---|---|---|---|
| Extractive Oracle | 42.68 | 9.66 | 21.33 |
| BART (406M) | 37.09 | 8.23 | 15.37 |
| T5 (738M) | 37.38 | 8.42 | 16.77 |
| Pegasus (568M) | 36.17 | 7.79 | 16.09 |
| Longformer (460M) | 32.84 | 7.45 | 14.59 |
| BigBird (577M) | 31.78 | 6.50 | 14.17 |
| Top Down Transformer (AvgPool) (464M) | 37.99 | 9.10 | 18.02 |
| Top Down Transformer (AdaPool) (464M) | 38.34 | 9.19 | 18.08 |
| Top Down Transformer (OracleAdaPool) | 41.10 | 9.49 | 19.19 |

*FIG. 8*

BookSum Book Level

| | R-1 | R-2 | R-L |
|---|---|---|---|
| Extractive Oracle | 46.62 | 9.17 | 18.31 |
| BART | 29.97 | 6.02 | 10.97 |
| T5 | 39.46 | 7.69 | 13.77 |
| Pegasus | 35.29 | 6.79 | 12.71 |
| 175B full tree RL | 41.51 | 10.46 | 16.88 |
| 175B first subtree RL | 43.19 | 10.63 | 17.10 |
| 6B full tree RL | 36.79 | 7.22 | 14.84 |
| Top Down Transformer (464M) | 44.19 | 10.89 | 16.13 |

*FIG. 9*

SYSTEMS AND METHODS FOR LONG DOCUMENT SUMMARIZATION

CROSS REFERENCES

The present disclosure is a nonprovisional of and claims priority under 35 U.S.C. 119 to U.S. provisional application No. 63/252,526, filed on Oct. 5, 2021, which is hereby expressly incorporated by reference herein in its entirety.

TECHNICAL FIELD

The embodiments relate generally to machine learning systems and document summarization, and specifically to systems and methods for efficiently summarizing long documents.

BACKGROUND

Text summarization aims to condense long documents and retain key information. Artificial intelligence (AI) models (e.g., Transformer models) have been used in performing document summarization. Existing systems often require a greater size of the underlying model for processing longer documents, which may either lead to heavy processing computational overhead or limited applicability. Some models may be able to produce summaries of long documents but tend to perform poorly as they ignore information due to processing efficiency concerns, for example by sparsely sampling the document or having only local attention windows. Therefore, there is a need for a more efficient and effective method for summarizing long documents.

BRIEF DESCRIPTION OF THE DRAWINGS

FIG. 4 illustrates example summarization datasets.

FIGS. 5-9 provide example tables illustrating example performance of different summarization models discussed herein.

Figure 1:
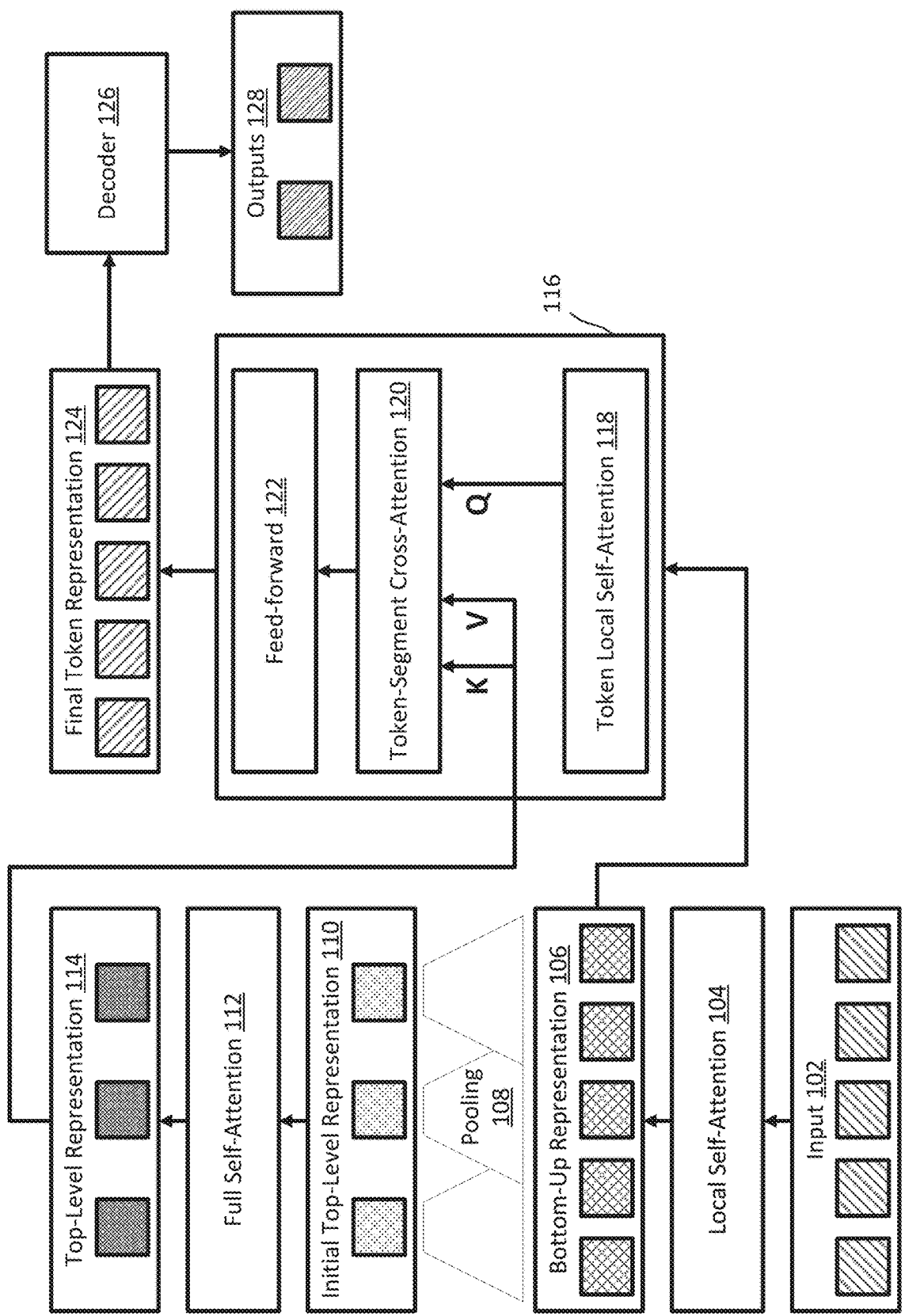
FIG. 1 is a simplified diagram showing a method for document summarization according to some embodiments.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

In view of the existing issues in text summarization, embodiments described herein are directed to a document summarization model which takes into account all of the information of the source document while preserving efficient processing complexity. This is achieved by jointly encoding the input of textual tokens into two different levels of representations. A bottom-up representation of the tokens is generated via a transformer with only local self-attention within a predefined window of each input token. A top-level representation of the tokens is generated by pooling the bottom-up inferred tokens, and passing the pooled tokens through a transformer with full self-attention. The top-level representation is used to update the bottom-up representation by another transformer using cross-attention between the two representations. The output tokens are then sent to a decoder which produces the output summary of the document.

In one embodiment, in the bottom-up inference, contextual embeddings of the tokens are computed with a specified number of layers of local self-attention. In particular, each token only attends to nearby tokens within a window of a specified size. The computation complexity is thereby limited in contrast to full self-attention models.

In the top-down inference, documents are encoded into representations at a coarser granularity level or at a more abstract temporal scale. This is referred to as a top-level or segment representation.

At the top-down inference, full self-attention may be efficiently used due to the coarser granularity, which allows these top-level units to capture global document context. The bottom-up inferred token representations may then be updated with the top-level representations. This may be achieved with cross-attention between the top-level (segment) and bottom-level (token) units. This injects global contextual information to token representations, which completes the combination of the bottom-up and top-down inference for token representation.

In some aspects, only one top-level representation is provided. In other aspects, especially for extremely long documents, more than one top level may be provided. When multiple top-level representation levels are used, they may have increasingly coarser granularity. In such cases, full self-attention is only applied to the level where it does not pose any computational challenges, while local self-attention can be adopted at all lower levels. In some aspects, top level representations are pooled at sentence, paragraph, and chapter divisions, depending on the number top level considered. In other aspects, a simpler approach is used where the top level consists of fixed-length segments of the documents.

Top-down inference relies on top-level representations, which can be obtained in various embodiments by which the tokens may be pooled in order to produce the coarser granularity units used by the top level. For example, in one embodiment, average pooling may be applied to the tokens. In another embodiment, an importance tagger is trained to weight each token. The importance tagger may be trained using the reference summaries by learning to give more weight to words that appear in the reference summaries. Herein the pooling method using an importance tagger is called ADAPool as described below with reference to FIG. 1.

In this way, because of the use of pooled top-level tokens, the documentation summarization model may be operated efficiently with higher memory and compute efficiency, compared to traditionally-used full attention transformers.

FIG. 1 is a simplified diagram showing a method for document summarization according to some embodiments. Input 102 represents an input document which is broken into individual tokens. The input 102 may, for example, be the text of a book, or some other long document, and the tokens may be individual words. Tokens may be represented as $t = \{t_i\}_{i=1}^{N}$.

The local self-attention 104 takes the token representations of inputs 102 and passes then through $N_1$ layers (e.g., 8 layers) of local self-attention to produce the bottom-up representation 106 comprising contextual embeddings of the tokens, $\{e_i | e_i \in \mathbb{R}^d\}_{i=1}^N$. It is local, as the self-attention is windowed so that each token $t_i$ only attends to other tokens within a predefined window size w surrounding that token. The complexity is hence O(Nw), where N is the number of input tokens in the bottom-up self-attention model, with a window size of w. This is in contrast to $O(N^2)$ for a full self-attention model. For example, a window size of 1024 would include 512 tokens on either side of the token of interest. The transformation of each token using local self-attention means that the inferred token representations do not include information from distant sections of the input 104. However, by limiting the attention to a local window, attention may be given at the token level efficiently enough to allow a large document to be processed with a reasonable amount of memory and time. The local self-attention layers 104 produce the bottom-up representation 106 which includes the same number of inferred tokens as input tokens.

The bottom-up representation 106 tokens are pooled via pooling 108 in order to produce an initial top-level representation 110. Pooling 108 may be accomplished using different embodiments. In one embodiment, average pooling may be applied to the tokens. In another embodiment, the reference summary is leveraged to define the importance of each token by training an importance tagger as described below.

For example, a document divided into M segments, and the embedding of the jth segment may be initialized as:

$$s_j^{(0)} = \Sigma_{n=1}^k p_n e_{j \times d + n}$$

In the equation above, k is the kernel size and d is the stride. $p_n$ is the weight for the nth token. At least two approaches may be used to compute the weights. A first method is average pooling (AvgPool) and hence $$p_n = \frac{1}{k},$$

which is simple and convenient. In a second approach, the reference summary is leveraged to define the importance of each token to assign adaptive weights via an importance tagger (AdaPool). Particularly, an importance tagger is learned with labels constructed with the reference summaries, which involves three steps: First, construct training labels for the importance tagger which consists of word lemmatization and labelling a document word as important if it appears in the reference word list and is a non-stopword; Second, train a top-down transformer encoder with constructed labels as the importance tagger; Third, train the summarization model with oracle weights (i.e., constructed labels from the first step) and test it with the adaptive importance weight assigned by the learned tagger. Oracle-AdaPool may also be used where the weights are obtained from the first step with the reference summaries. Note that if $\{P_n\}_{n=1}^k$ does not form a valid probability distribution, $s_j$ can be computed with a normalized weight distribution within each pooling window as follows, $$s_j^{(0)} = \frac{\sum_{n=1}^k \exp(p_n) e_{j \times d + n}}{\sum_{n=1}^k \exp(p_n)}$$

The initial top-level representation 110 segments, $\{s_j^{(0)}\}_{j=1}^M$, are updated with full self-attention 112, yielding top-level representation 114 segments, $\{s_j\}_{j=1}^M$, which are then used in top-down inference for token representations. Full self-attention 112 may be comprised of $N_2$ self-attention layers (e.g., 2 layers). It is possible to apply full self-attention at the top level due to its coarser granularity, allowing these top-level units to capture global document context. In some aspects, the full self-attention 112 is a traditional multi-head self-attention. Top-level representation 114 segments may be represented as $\{s_j | s_j \in \mathbb{R}^d\}_{j=1}^M$.

The bottom-up representation 106 may then be updated with the top-level representation 114. This is achieved with $N_3$ top-down inference 116 layers (e.g., 4 layers). Each layer contains three transformations on $\{e_i\}$: token self-attention 118, token-segment cross-attention 120, and feed-forward 122. In some aspects, token local self-attention 118 and feed-forward 22 are the same as those in local self-attention 104. In particular, each $e_i$ is updated with cross-attention, $$\tilde{e}_i = e_i + LayerNorm\left(\sum_{j=1}^M \alpha_{ij} f_v(s_j)\right), \alpha_{ij} = \frac{\exp(f_q(e_i)^T f_k(s_j))}{\sqrt{d} \sum_{l=1}^M \exp(f_q(e_i)^T f_k(s_l))}$$

where $f_q$, $f_k$, and $f_v$ indicate query, key, and value linear mappings, respectively. For notional clarity, the above equation only illustrates the case with a single attention head. In practice, multiheads may be used. Token-segment cross-attention 120 injects global contextual information into bottom-up-inferred token representations 106, $e_i$, and yields global-context-aware token representations, $\tilde{e}_i$, conditioning on which a summary can be generated by a decoder.

In one embodiment, a top level unit may be any of a sentence, paragraph, and chapter, depending on the number of top levels considered. Such a choice however might lead to complicated implementations and non-scalability due to the varying length of these units. Therefore, in some aspects, a simpler approach may be used where the top level consists of fixed-length segments of the documents. While examples herein use a single top level, multiple top levels can be simply achieved with segments with increasingly coarser granularity.

Full self-attention 112 has a complexity of $O(M^2)$, and token-segment cross-attention 120 has a complexity of O(NM), where N denotes the number of tokens in the document, and M denotes the number of segments. Thus, together with bottom-up inference, the complexity is $O(Nw+M^2+NM)$, where w denotes the local self-attention window size. In some aspects, w (window size) and M (number of segments) are relatively small.

The output of top-down inference 116 is a final token representation 124. The final token representation 124 may then be input into a decoder 126 which produces outputs 128. Outputs 128 represent tokens which comprise a summary of the input 102.

In some aspects, the outputs 128 are compared with a reference summary in order to compute a loss, e.g., the cross-entropy between the output summary 128 with the reference summary. The computed loss may be used to update parameters of the local self-attention 104, full self-attention 112, Token local self-attention 118, Token-segment cross-attention 120, feed-forward 122, and decoder 126.

Figure 2:
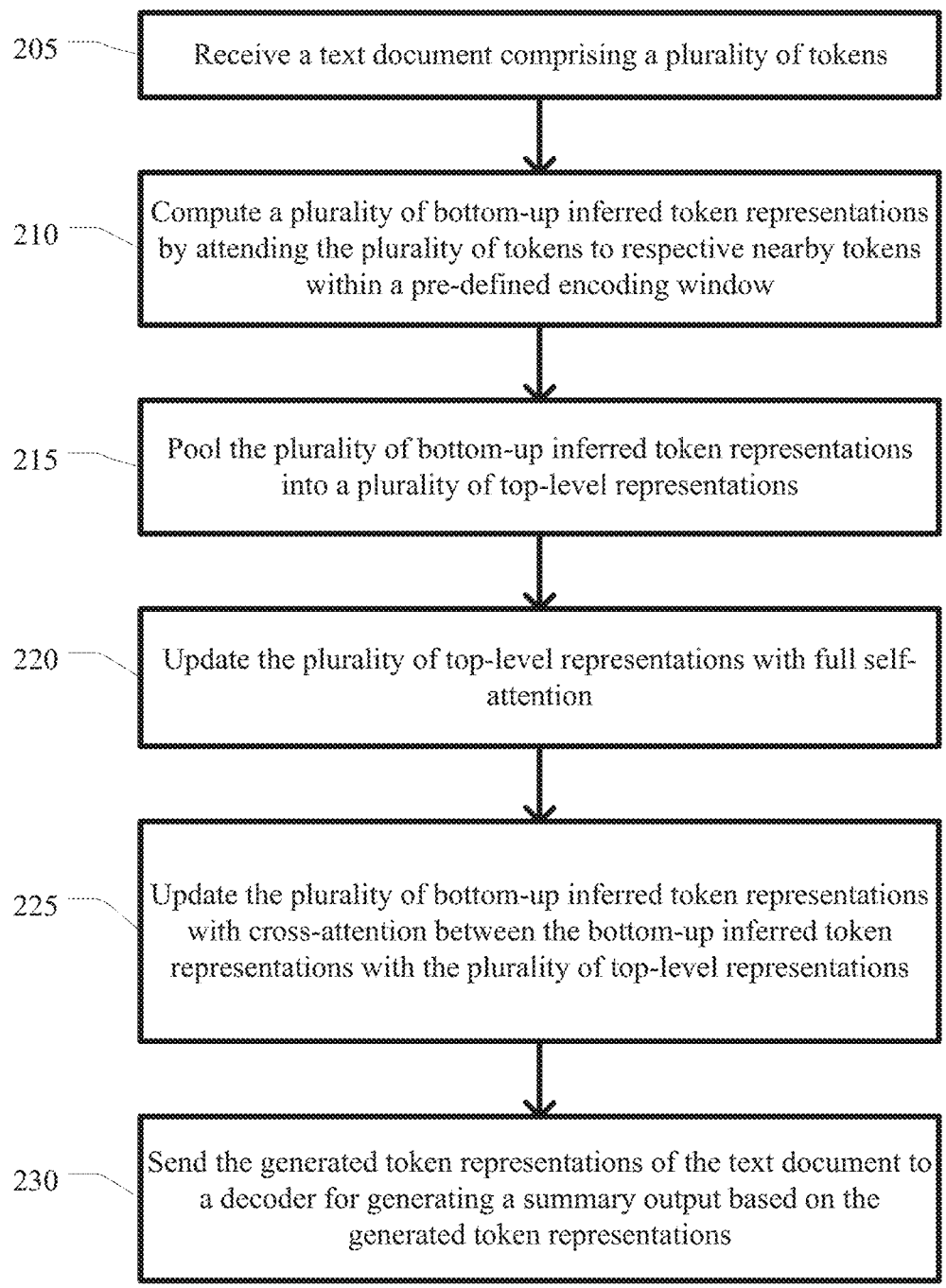
FIG. 2 provides an example logic flow diagram illustrating an example algorithm for a document summarization system, according to some embodiments.

FIG. 2 provides an example logic flow diagram illustrating an example algorithm for a document summarization system, according to some embodiments. One or more of the processes described in FIG. 2 may be implemented, at least in part, in the form of executable code stored on non-transitory, tangible, machine-readable media that when run by one or more processors may cause the one or more processors to perform one or more of the processes 205-230. In some embodiments, method 200 may correspond to the method used by the summarization module 330 in FIG. 3.

At step 205, a system receives a text document comprising a plurality of tokens.

At step 210, the system computes a plurality of bottom-up inferred token representations by attending the plurality of tokens to respective nearby tokens within a pre-defined encoding window. For example, the plurality of tokens passes through 8 layers of local self-attention to produce a bottom-up representation comprising contextual embeddings of the tokens. An example window size of 1024 would include 512 tokens on either side of the token of interest. The transformation of each of the plurality of tokens using local self-attention means that the inferred token representations do not include information from distant sections of the text document. However, by limiting the attention to a local window, attention may be given at the token level efficiently enough to allow a large document to be processed with a reasonable amount of memory and time.

At step 215, the system pools the plurality of bottom-up inferred token representations into a plurality of top-level representations. As discussed above, a variety of pooling methods may be used, including a simple average pooling, or a more complex pooling with learned weights. The result is that the plurality of top-level representations are fewer than the bottom-up inferred token representations, allowing for a more efficient full self-attention step.

At step 220, the system updates the plurality of top-level representations with full self-attention.

At step 225, the system updates the plurality of bottom-up inferred token representations with cross-attention between the bottom-up inferred token representations and the plurality of top-level representations. Cross-attention with the top-level representations injects global contextual information into the bottom-up inferred token representations and yields global-context-aware token representations. This provides a balance between global context and local fine granularity attention.

At step 230, the system sends the generated token representations of the text document to a decoder for generating a summary output based on the generated token representations.

Figure 3:
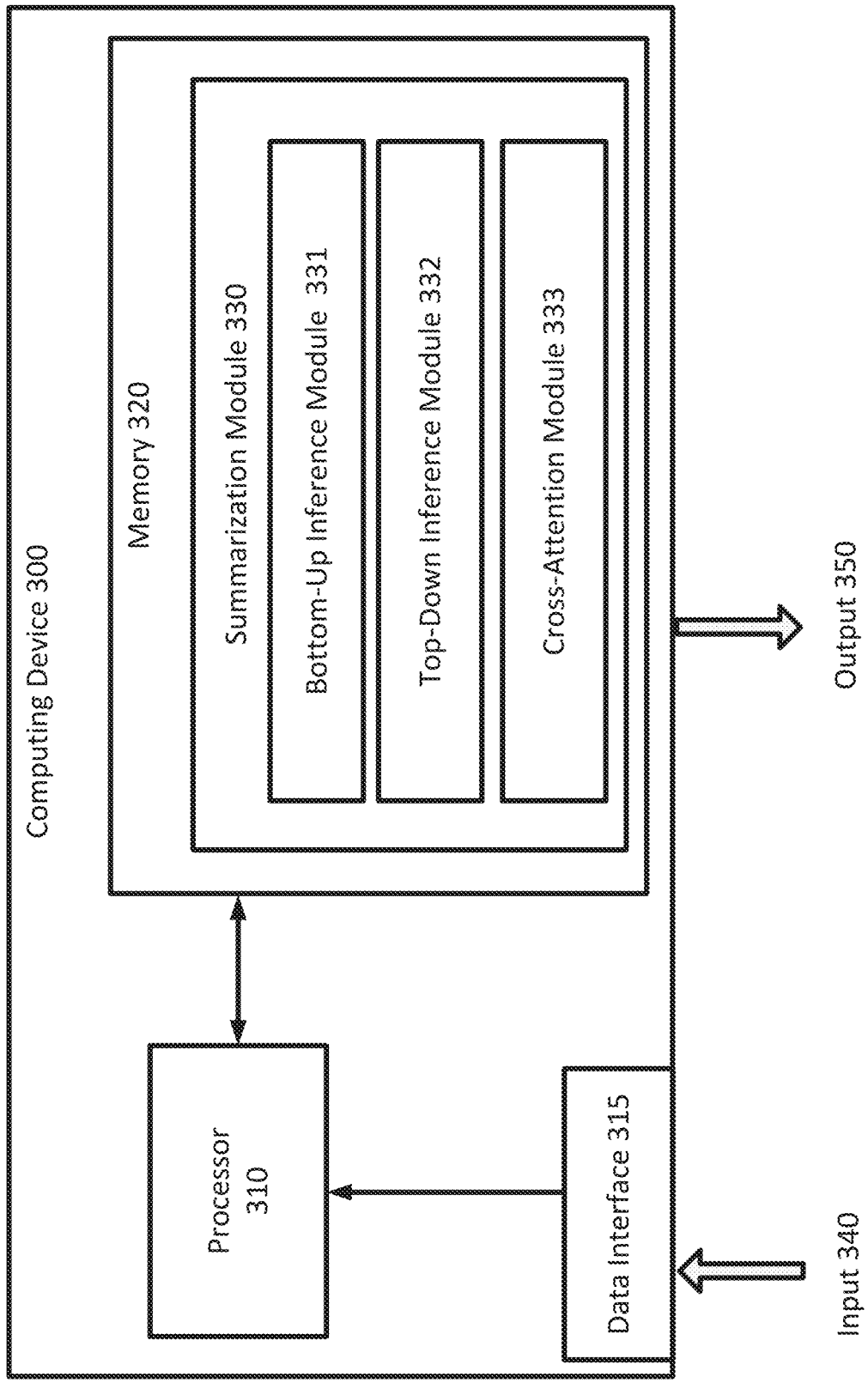
FIG. 3 is a simplified diagram of a computing device that performs document summarization.

FIG. 3 is a simplified diagram of a computing device that implements the document summarization, according to some embodiments described herein. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a Summarization module 330 that may be used to implement and/or emulate the systems and models, and/or to implement any of the methods described further herein. In some examples, the Summarization module 330, may receive an input 340, e.g., such as a long document, via a data interface 315. The data interface 315 may be a communication interface that may receive or retrieve previously stored documents from a database. The Summarization module 330 may generate an output 350, such as a summary of the input 340.

In some embodiments, the Summarization module 330 may further include the bottom-up inference module 331, top-down inference module 332, and a cross-attention module 333. The bottom-up inference module 331 is configured to produce bottom-up representation tokens of an input document using local self-attention. For example, as discussed with reference to local self-attention 104 of FIG. 1, and step 210 of FIG. 2.

The top-down inference module 332 is configured to pool the bottom-up representation tokens into top-level representations (i.e., segments), and update those segments using full self-attention. For example, as described with reference to pooling 108 and full self-attention 112 of FIG. 1. In some aspects, top-down inference module comprises multiple levels of granularity each with a pooling layer therebetween, where only the final top level is updated using full self-attention and the intermediate levels are updated with local self-attention.

The cross-attention module is configured to update the bottom-up inferred token representations with the top-level representations using cross-attention between the top-down and bottom-up representations. For example, as described with reference to top-down inference 116 of FIG. 1. The final token representations are attended by a decoder to generate a summary at output 350.

Some examples of computing devices, such as computing device 300 may include non-transitory, tangible, machine readable media that include executable code that when run by one or more processors (e.g., processor 310) may cause the one or more processors to perform the processes of methods described herein. Some common forms of machine-readable media that may include the processes of methods described herein are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 4 illustrates example summarization datasets. Specifically, the table in FIG. 4 illustrates the total number of documents, the average number of input words, the average number of summary words, and the domain for each dataset. The model was evaluated on two standard long document summarization benchmarks, PubMed (a large biomedical literature database) and arXiv described in Cohan et al., A discourse-aware attention model for abstractive summarization of long documents, in Proceedings of the 2018 Conference of the North American Chapter of the Association for Computational Linguistics: Human Language Technologies, Volume 2 (Short Papers), pages 615-621, 2018. It outperforms various efficient transformers and other approaches and achieves state-of-the-art performance. Although focused on long document summarization, models under the framework described herein are also applicable to shorter documents. The model was tested on CNN-Dailymail (CNN-DM) described in See et al., Get to the point: Summarization with pointer-generator networks, in Proceedings of the 55th Annual Meeting of the Association for Computational Linguistics (Volume 1: Long Papers), pages 1073-1083, 2017. Compared to a full self-attention model, the model achieves competitive or better performance but is more memory- and compute-efficient. A more challenging benchmark, SummScreen described in Chen et al., Summscreen: A dataset for abstractive screenplay summarization, arXiv preprint arXiv:2104.07091, 2021, where summarization systems need to summarize TV show scripts, was tested against. These documents convey plot events often indirectly and implicitly in dialogues, in contrast to news and scientific articles where statements follow a logical order and facts are offered explicitly. Moreover, a typical episode contains multiple subplots that proceed in parallel. Solving this benchmark thus requires a system to draw information from utterances spreading out through the entirety of the input and integrate them to a concise description. The model outperforms strong baselines on this challenging benchmark by a significant margin. Another challenging dataset, BookSum described in Kryściński et al., Booksum: A collection of datasets for long-form narrative summarization, arXiv preprint arXiv:2105.08209, 2021, was tested against. It covers books from the literature domain, including stories, plays, and novels. Similar to SummScreen, it requires integrating plot events from indirectly expressed descriptions. A further challenge is to process long-form texts up to hundreds of pages or over 100,000 words. A model under the framework described herein does well on this challenge, achieving competitive or superior performance compared to a concurrent work using GPT-3. While the GPT-3-based model has 175 billion parameters and requires human labelers to extensively write summaries and provide reward information, the model described herein with 464 million parameters is 380 times smaller and merely requires training on relatively minimal data. These results suggest the framework described herein is generally effective for documents of various lengths and domains.

The same encoder-decoder architecture was tested for all datasets. The tested encoder has 8 bottom-up inference layers and 4 top-down inference layers for tokens, and 2 self-attention layers for segments. The decoder has 12 layers. The encoder layers for tokens (12 layers) and the decoder layers are all initialized from BART described in Lewis et al., BART: Denoising sequence-to-sequence pre-training for natural language generation, translation, and comprehension, in Proceedings of the 58th Annual Meeting of the Association for Computational Linguistics, pages 7871-7880, 2020, except the parameters for token-segment cross-attention in the top-down inference layers, which are randomly initialized. The self-attention parameters for segments are also randomly initialized. The window size is 1024 unless otherwise specified. These settings closely follow Longformer described in Beltagy et al., Longformer: The long-document transformer, arXiv preprint arXiv: 2004.05150, 2020, which has 12 layers for the encoder and decoder, is initialized from BART, and uses a local window size of 1024. Thus, comparison with Longformer is a test of the effect of top-down correction for token representations. Standard train/validation/test splits are used for all datasets. Model performance is evaluated with ROUGE scores described in Lin, ROUGE: A package for automatic evaluation of summaries, in Text Summarization Branches Out, pages 74-81, 2004. Reported performance is based on the checkpoint with the best validation R-2 score.

FIG. 5 provides an example table illustrating example performance of different summarization models discussed herein. Specifically, the table in FIG. 5 illustrates results on scientific articles. Best performance (not relying on oracle) is in bold, and the second best is underlined. The effectiveness of the framework described herein was tested on two widely used datasets based on scientific documents, PubMed and arXiv. They consist of long documents of length ranging from several thousands of words to over ten thousand words. Each document in PubMed is a scientific article, collected from PubMed.com, and the reference summary is the associated abstract. Documents in arXiv are collected from arxiv.org. Three variants of the model with various pooling weights are illustrated in the table of FIG. 5. AvgPool, AdaPool, and OracleAdaPool in FIG. 5 indicate average pooling, pooling with adaptive weights, pooling with adaptive weights determined by references, respectively.

Pegasus is pretrained on a large-scale of dataset with a pretraining objective specifically designed for summarization. It uses a full self-attention encoder and thus has to truncate the source document due to the quadratic memory complexity. The summarization-oriented large-scale pre-training makes it a strong baseline. Dancer described in Gidiotis et al., A divide-and-conquer approach to the summarization of long documents, in IEEE/ACM Transactions on Audio, Speech, and Language Processing (Volume 28), pages 3029-3040, 2020, takes a divide-and-conquer approach in which the summary is divided into sections and each section is paired to the appropriate section of the document and the model is trained on short sequences and has a low memory requirement. This is a straightforward approach achieving strong performance.

TLM-I+E described in Pilault et al., On extractive and abstractive neural document summarization with transformer language models, in Proceedings of the 2020 Conference on Empirical Methods in Natural Language Processing (EMNLP), pages 9308-9319, 2020, first extracts salient sentences and then uses a GPT-style model to generate a summary by conditioning on the introduction section and extracted sentences (instead of the whole document), thus reducing memory requirement. SSN-DM described in Cui & Hu, Sliding selector network with dynamic memory for extractive summarization of long documents, in Proceedings of the 2021 Conference of the North American Chapter of the Association for Computational Linguistics: Human Language Technologies, pages 5881-5891, 2021, is an extractive model and uses a sliding encoder to process segments of a document and a memory module to capture autoregressive dependency between segments. These two models bear similarities to the model described herein in that they use a multi-scale structure. The extracted only salient sentences in TLM-I+E can be considered a representation of the document at a coarser granularity since salient information is retained. Instead of keeping the coarser representations in the latent space, TLM-I+E reads out them to the observed word space. In SSN-DM, the fixed-size memory module pooling information from each segments can also be considered a high level representation of the document. Despite these similarities, the model described herein, following a principled framework to synergize bottom-up and top-down inference, clearly outperforms these prior models.

BigBird as described in Zaheer et al., Big bird: Transformers for longer sequences, in NeurIPS, 2020, Longformer, and LSH as described in Kitaev et al., Reformer: The efficient transformer, in International Conference on Learning Representations, 2020, are efficient transformers. BigBird based on Pegasus pre-training combines local attention, random attention tokens, and global attention tokens. LSH uses content-dependent sparse attention based on local sensitivity hashing. Longformer is closely related to the models described herein. It uses the same local attention as in the bottom-up inference except it has an extra [CLS] token which is a global attention token. Longformer is also initialized from BART, same as the model described herein. The main difference is that the model described herein infers token representations with both top-down and bottom-up inference, in contrary to pure bottom-up inference in Longformer. The clear performance improvement over Longformer and other efficient transformers indicates the effectiveness of the synergy of bottom-up and top-down inference.

FIG. 6 provides an example table illustrating example performance of different summarization models discussed herein. Specifically, the table in FIG. 6 illustrates results on CNN-DailyMail. Best performance (not relying on oracle) is in bold, and the second best is underlined. To demonstrate the general applicability of the framework described herein, its efficiency and effectiveness on short document summarization and compared to a full self-attention inference model are charted in FIG. 6. Although the bottom-up inference uses local self-attention (for efficiency), the top-down correction may enable the effectiveness of the inference of the model described herein and hence lead to competitive or better summarization performance.

The model parameters used for FIG. 6 are initialized from BART. Hence, BART with full self-attention forms a natural baseline, allowing for direct comparison. In the bottom-up inference, the local attention window size is 256. As shown in FIG. 6, models under the framework described herein achieve slightly better performance, especially in terms of R-1 and R-L, than BART. It confirms that a synergy of bottom-up inference with local attention and top-down inference with global attention is effective and achieves on-par or better performance as full self-attention.

FIG. 7 provides an example table illustrating example performance of different summarization models discussed herein. Specifically, the table in FIG. 7 illustrates results on SummScreen. Best performance (not relying on oracle) is in bold, and the second best is underlined. Scientific and news articles often require that facts are offered explicitly and statements follow a logical order, which might allow summarization models to exploit layout and stylistic biases. The framework described herein was tested on a more challenging dataset, SummScreen, which requires a model to draw and integrate information from indirect expressions across a wide range of the document. SummScreen provides two datasets, TVMegaSite and ForeverDreaming, collecting from two different TV show transcript websites. Each document is the transcript of a TV show episode and the summary is an associated recap. FIG. 7 summarizes the results. Extractive oracle is an extractive method by extracting nearest neighbors based on Rouge scores. Longformer is an abstractive method and takes the whole document as input. Hybrid models first select salient sentences and then input them to BART. The tested models outperform these strong baselines and even achieves comparable or superior performance than those having access to oracle information.

FIGS. 8 and 9 provide example tables illustrating example performance of different summarization models discussed herein. Specifically, the table in FIG. 8 illustrates results on BookSum Chapter Level. Best performance (not relying on oracle) is in bold, and the second best is underlined. BookSum is another challenging dataset, consisting of books from the literature domain including stories, plays and novels. It includes examples on three levels of granularity with increasing difficulty: (1) paragraph-level with inputs with hundreds of words, (2) chapter-level, with inputs with several thousands or over ten thousands of words, (3) book-level, with inputs spanning up to hundreds of pages and over hundred thousands of words. The chapter-level examples have comparable lengths to other popular long-form summarization datasets such as PubMed, arXiv. The book-level summarization is extremely challenging. First, the number of examples (313 books) is limited. Second, a book is too long to fit in current models. The model may be trained in a curriculum and recursive way to address the two issues.

The results in FIG. 8 represent a test using the chapter level of BookSum. One approach is to divide-and-conquer to summarize chapters. Some models finetune BART, T5 described in Raffel et al., Exploring the limits of transfer learning with a unified text-to-text transformer, in Journal of Machine Learning Research (Volume 21), pages 1-67, 2020, and Pegasus described in Zhang et al., Pegasus: Pre-training with extracted gap-sentences for abstractive summarization, in International Conference on Machine Learning, pages 11328-11339, 2020, on the paragraph level data and the chapter summary is obtained by concatenating the paragraph summary. This might miss the intra-paragraph context. The models described herein directly summarize the whole chapters and outperform these divide-and-conquer models. Efficient transformers, Longformer and BigBird, are also able to take in the whole chapters as inputs. But these bottom-up approaches clearly underperform the models described herein.

The results in FIG. 9 represent a test using the book level of BookSum. Best performance (not relying on oracle) is in bold, and the second best is underlined. The model was trained with a top-down transformer on the chapter-level data and then fine-tuned on the book-level data. The inputs to the book-level model are (1) the concatenated chapter reference summaries in training or (2) the concatenated chapter summaries generated by the chapter-level model in testing. The chapter-to-book curriculum training is to mitigate the scarcity of book-level data. The recursive summarization of chapters and then books can be considered abstractive content selection applied to book data, and is used to address the extremely long length of books.

The middle section of FIG. 9 shows the performance for the models with the divide-and-conquer approach, same as those for the chapter-level data. A model based on GPT-3 with reinforcement learning (RL) also attempts to summarize books. Their method shares similarity with the model described herein in that they decompose books into shorter sequences and train the model and summarize the text segments recursively. There are four major differences between the approach described herein and theirs. First, the model described herein has only 464 million parameters and is 380 times smaller than GPT-3 with 175 billion parameters. Second, the model described herein is trained with the limited and publicly available data from BookSum, while the other model requires human labelers to write summaries and give preference, which is highly costly. Third, the model described herein has lower complexity, allowing it to take in longer input. Thus, the model described herein only needs to decompose the book one time (into chapters), in contrast to multiple recursive decomposition steps. Multiple recursive summarization steps is prone to accumulating errors. Fourth, GPT-3 uses bottom-up inference to infer token representations, in contrast to the synergy of bottom-up and top-down inference in the approach described herein, which may lead to better representation inference. The last two differences might account for the competitive performance of the model described herein using a much smaller model and less data.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for document summarization, the method comprising:

receiving, via a communication interface, a text document comprising a plurality of tokens;

computing, at an attention layer, a first set of token representations by attending the plurality of tokens to respective nearby tokens within a pre-defined encoding window;

generating, by a pooling layer, a set of segment representations from the computed first set of token representations from the attention layer;

updating the set of segment representations with a full self-attention layer;

generating a second set of token representations by applying cross attention upon the first set of token representations and the updated set of segment representations after the full self-attention layer; and sending the generated second set of token representations of the text document to a decoder for generating a summary output based on the second set of token representations.

2. The method of claim 1, wherein the first set of token representations are generated in a bottom-up manner via a transformer with only local self-attention within a pre-defined window of each input token.

3. The method of claim 1, wherein the set of segment representations are top-level representations generated by pooling the first set of token representations, and passing the set of segment representations through a transformer with full self-attention.

4. The method of claim 1, wherein the cross attention is applied by:

inputting the updated set of segment representations as keys and values to a transformer layer; and inputting the first set of token representations as queries to the transformer layer.

5. The method of claim 1 wherein the set of segment representations are generated by:

computing a weighted average of tokens within respective subsets of the first set of token representations.

6. The method of claim 1, further comprising:

generating, via a pooling layer, a set of intermediate representations from the first set of token representations; and applying local self-attention to the set of intermediate representations, wherein the set of intermediate representations are pooled to form at least a part of the set of segment representations.

7. The method of claim 1, further comprising:

updating the first set of token representations with local self-attention to produce a third set of token representations, wherein the updating the first set of token representations with cross-attention comprises updating the third set of token representations with cross-attention between the third set of token representations and the set of segment representations.

8. A system for document summarization, the system comprising:

a memory that stores a summarization model;

a communication interface that receives a text document comprising a plurality of tokens; and one or more hardware processors that:

computes, at an attention layer, a first set of token representations by attending the plurality of tokens to respective nearby tokens within a pre-defined encoding window;

generates, by a pooling layer, a set of segment representations from the computed first set of token representations from the attention layer;

updates the set of segment representations with a full self-attention layer;

generates a second set of token representations by applying cross attention upon the first set of token representations and the updated set of segment representations after the full self-attention layer; and sends the generated second set of token representations of the text document to a decoder for generating a summary output based on the second set of token representations.

9. The system of claim 8, wherein the first set of token representations are generated in a bottom-up manner via a transformer with only local self-attention within a pre-defined window of each input token.

10. The system of claim 8, wherein the set of segment representations are top-level representations generated by pooling the first set of token representations, and passing the set of segment representations through a transformer with full self-attention.

11. The system of claim 8, wherein the cross attention is applied by:
inputting the updated set of segment representations as keys and values to a transformer layer; and
inputting the first set of token representations as queries to the transformer layer.

12. The system of claim 8 wherein the set of segment representations are generated by:
computing a weighted average of tokens within respective subsets of the first set of token representations.

13. The system of claim 8, wherein the one or more hardware processors further:
generates, via a pooling layer, a set of intermediate representations from the first set of token representations; and
applies local self-attention to the set of intermediate representations,
wherein the set of intermediate representations are pooled to form at least a part of the set of segment representations.

14. The system of claim 8, wherein the one or more hardware processors further:
updates the first set of token representations with local self-attention to produce a third set of token representations,
wherein the updating the first set of token representations with cross-attention comprises updating the third set of token representations with cross-attention between the third set of token representations and the set of segment representations.

15. A processor-readable non-transitory storage medium storing a plurality of processor-executable instructions for training a multi-document summarization model, the instructions being executed by at least one processor to perform operations comprising:

receiving, via a communication interface, a text document comprising a plurality of tokens;

computing, at an attention layer, a first set of token representations by attending the plurality of tokens to respective nearby tokens within a pre-defined encoding window;

generating, by a pooling layer, a set of segment representations from the computed first set of token representations from the attention layer;

updating the set of segment representations with a full self-attention layer;

generating a second set of token representations by applying cross attention upon the first set of token representations and the updated set of segment representations after the full self-attention layer; and sending the generated second set of segment representations of the text document to a decoder for generating a summary output based on the second set of segment representations.

16. The processor-readable non-transitory storage medium of claim 15, wherein the first set of token representations are generated in a bottom-up manner via a transformer with only local self-attention within a predefined window of each input token.

17. The processor-readable non-transitory storage medium of claim 15, wherein the set of segment representations are top-level representations generated by pooling the first set of token representations, and passing the set of segment representations through a transformer with full self-attention.

18. The processor-readable non-transitory storage medium of claim 15, wherein the cross attention is applied by:
inputting the updated set of segment representations as keys and values to a transformer layer; and
inputting the first set of token representations as queries to the transformer layer.

19. The processor-readable non-transitory storage medium of claim 15 wherein the set of segment representations are generated by:
computing a weighted average of tokens within respective subsets of the first set of token representations.

20. The processor-readable non-transitory storage medium of claim 15, the instructions being executed by a processor to perform operations further comprising:
generating, via a pooling layer, a set of intermediate representations from the first set of token representations; and
applying local self-attention to the set of intermediate representations,
wherein the set of intermediate representations are pooled to form at least a part of the set of segment representations.

* * * * *